United States Patent [19]

Neff

[11] Patent Number: 4,465,100
[45] Date of Patent: Aug. 14, 1984

[54] FOUR-WAY STACKING VALVE WITH COMMON ELECTRICAL CONDUIT AND INDIVIDUAL BODY MOUNTED EXHAUST FLOW CONTROLS

[75] Inventor: James A. Neff, Bloomfield Township, Oakland County, Mich.

[73] Assignee: Mac Valves, Inc., Wixom, Mich.

[21] Appl. No.: 352,769

[22] Filed: Feb. 26, 1982

[51] Int. Cl.³ .............................................. F15B 13/08
[52] U.S. Cl. .......................... 137/625.64; 137/596.16; 137/884
[58] Field of Search .............. 137/596, 596.16, 625.64, 137/625.65, 625.66, 625.69, 884, 885

[56] References Cited

U.S. PATENT DOCUMENTS

| | | | |
|---|---|---|---|
| 2,993,511 | 7/1961 | Johnson | 137/625.64 |
| 3,215,158 | 11/1965 | Bass et al. | 137/596.16 X |
| 3,504,704 | 4/1970 | Beckett et al. | 137/625.64 |
| 3,513,876 | 5/1970 | Tarbox | 137/596 |
| 3,550,621 | 12/1970 | Lansky et al. | 137/884 |
| 3,608,586 | 9/1971 | Daggy | 137/625.65 |
| 3,633,624 | 1/1972 | Leibfritz et al. | 137/625.64 |
| 4,267,862 | 5/1981 | Neff et al. | 137/625.66 X |
| 4,359,064 | 11/1982 | Kimble | 137/625.64 X |

Primary Examiner—Gerald A. Michalsky
Attorney, Agent, or Firm—Robert G. Mentag

[57] ABSTRACT

A four-way stacking air valve with a common exhaust passageway that extends through all of the valves in a stack of valves and a pair of end plates, and with each of the valves being provided with a pair of adjustable flow control valves mounted in the valve body in separate exhaust passages connected to the common exhaust passageway. A common electrical wire passage extends through all of the valves and end plates in a stack of valves. Each of the valves has a wire tuck chamber in the valve body, on each side of the electrical wire passage. Each of the valves can be operated by one, or two solenoid operated pilot valves. The pilot air valves may employ either internal or external pilot air which is provided through common pilot air supply passageways in the valves and end plates. The pilot air is exhausted through a common pilot air exhaust passageway that extends through all of the valves in a stack of valves to exhaust ports in the end plates of the stack of valves.

6 Claims, 4 Drawing Figures

FOUR-WAY STACKING VALVE WITH COMMON ELECTRICAL CONDUIT AND INDIVIDUAL BODY MOUNTED EXHAUST FLOW CONTROLS

TECHNICAL FIELD

This invention relates generally to the air valve art, and more particularly to an improved four-way valve having a common electrical conduit and individual body mounted exhaust flow controls. The four-way valve can be used in stacks with other valves having a common pressurized air inlet passageway and a common exhaust outlet passageway, and wherein each exhaust passage between the common exhaust outlet passageway and each exhaust chamber in the main valve spool bore has an individual flow control valve mounted in the valve body. The air valve of the present invention is adapted for use in an air flow line for controlling the flow of pressurized air to both ends of an air cylinder, or the like.

BACKGROUND ART

It is known in the air valve art to provide valves which can be employed in stacks. Heretofore stackable air valves have been provided which include flow control valves in exhaust ports. However, it has not been possible heretofore to provide a stacking body which will provide a four-way stacking valve with a stacking body provided with a separate flow control valve for each exhaust passage between a common exhaust outlet passage and each exhaust chamber in the main valve spool bore and with a common electrical conduit so as to permit a solenoid to be electrically connected to the air valve with one connection at each individual valve in a stack of valves. Flow control valves have been used before in exhaust ports in more complicated structures, as in U.S. Pat. Nos. 2,912,007 and 2,993,511.

DISCLOSURE OF THE INVENTION

In accordance with the present invention, a four-way stacking air valve is provided which has integral flow controls in individual exhaust passages in the body of the valve. A stack of the valves may be operatively positioned between a pair of end plates which are each provided with a single exhaust outlet passageway and port which are connected to a common exhaust outlet passageway running through all of the valves in the stack of valves. The end plates are also each provided with a single inlet port and passageway that supplies air under pressure to all of the valves in the stack of valves through a common pressurized air inlet passageway that extends through all of the valves in the stack.

The two exhaust chambers in the main valve spool bores in each of the valves in the stack exhaust into a common exhaust outlet passageway that is connected to a similar common exhaust passageway in the adjacent valves in the stack and thence to exhaust ports in end plates. Each of the valves in the stack is provided with a pair of common pilot air supply passages which may be supplied with internal pilot air from the common pressurized air inlet passageway, or from an external supply of pilot air. All of the valves in the stack are also connected to a common pilot air exhaust passageway whereby the pilot air can be selectively dumped to the atmosphere through a suitable muffler, or piped away to an external location. A flow control is operatively mounted in each exhaust passage of each valve in the stack to control the exhaust air coming out of either end of an air cylinder, to control the speed at which the cylinder travels from one position to another. Each valve in the stack may be provided with a two-position valve spool assembly, or a self-centering, three-position valve spool assembly, with a pilot air operated piston means operatively engaged with one end of the valve spool in each valve.

BEST MODE OF CARRYING OUT THE INVENTION

Figure 1:
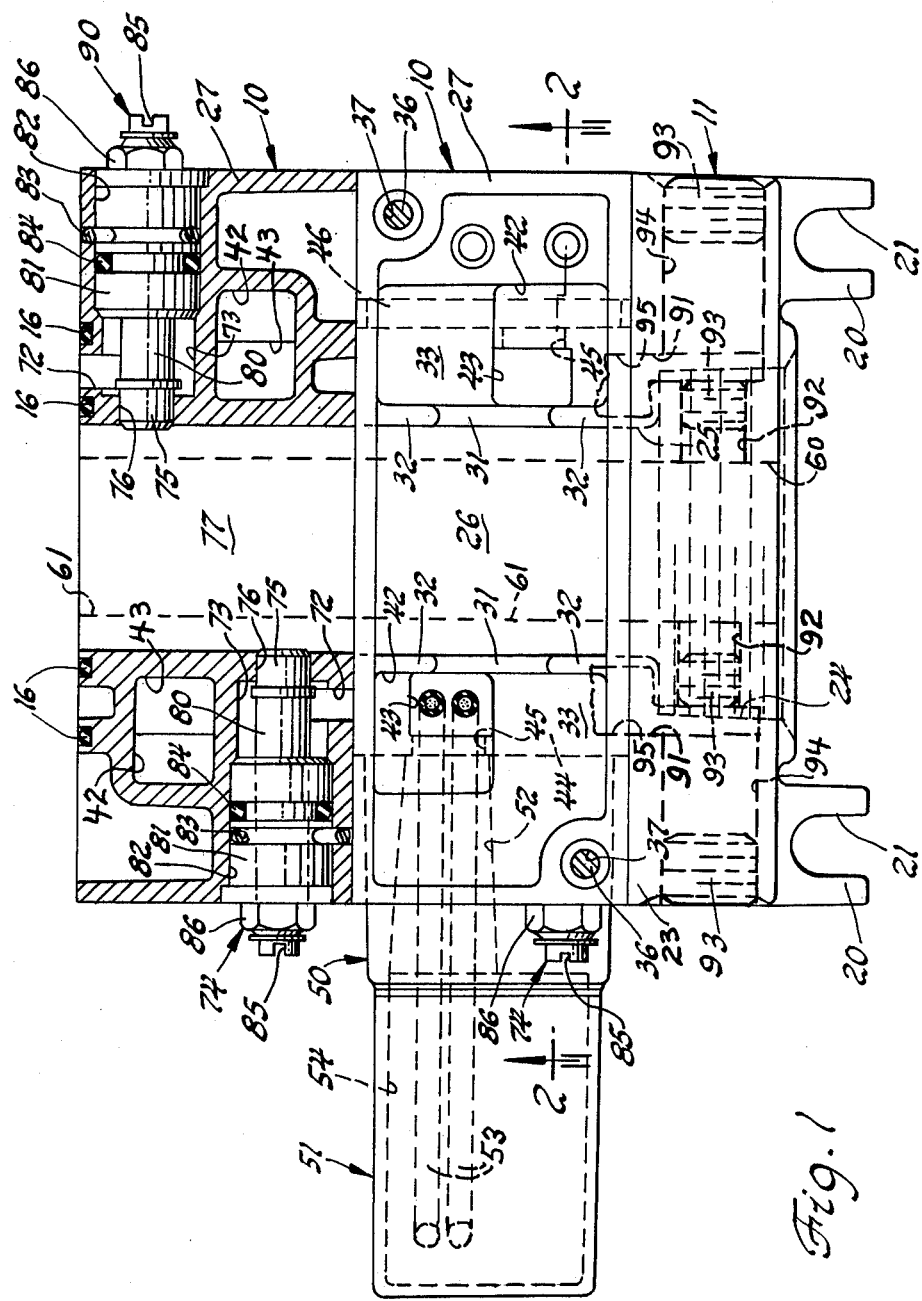
FIG. 1 is a top plan view, partly in section, and with parts removed, of a four-way stacking valve made in accordance with the principles of the present invention.
Figure 2:
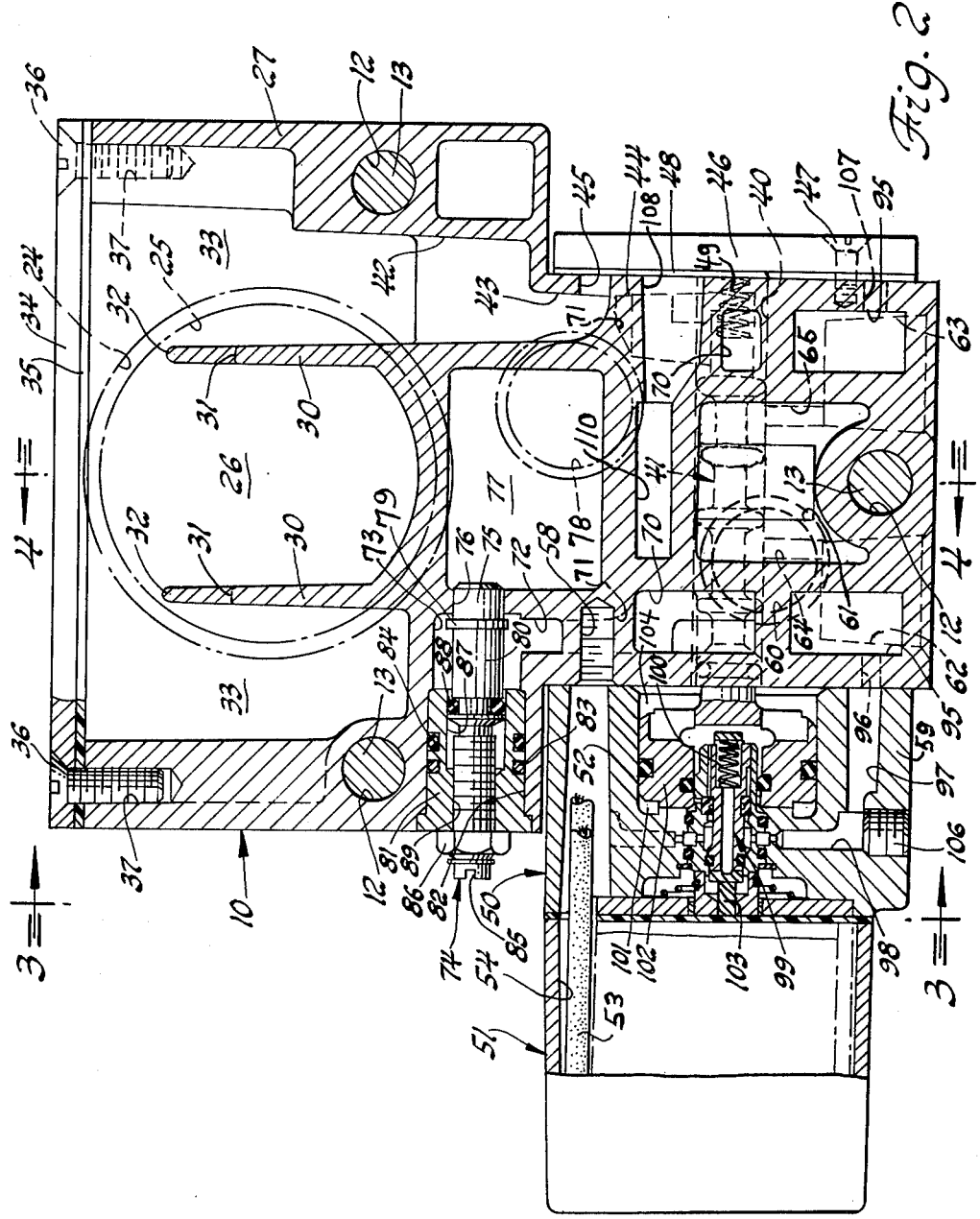
FIG. 2 is an elevation section view, with parts removed, of the valve structure illustrated in FIG. 1, taken along the line 2—2 thereof, and looking in the direction of the arrows.
Figure 3:
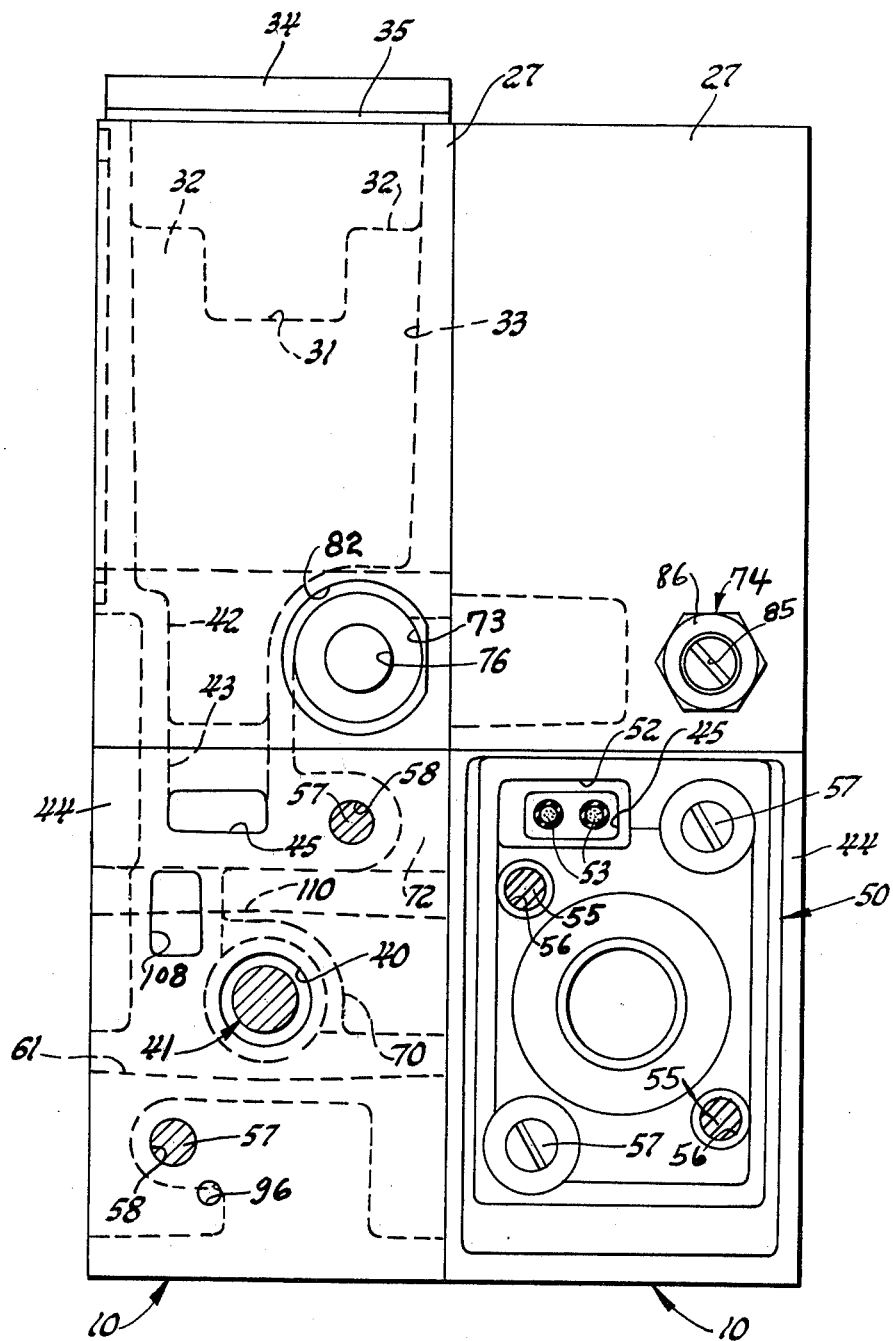
FIG. 3 is a left side elevation view of the valve structure illustrated in FIG. 2, with parts removed, taken along the line 3—3 thereof, and looking in the direction of the arrows.
Figure 4:
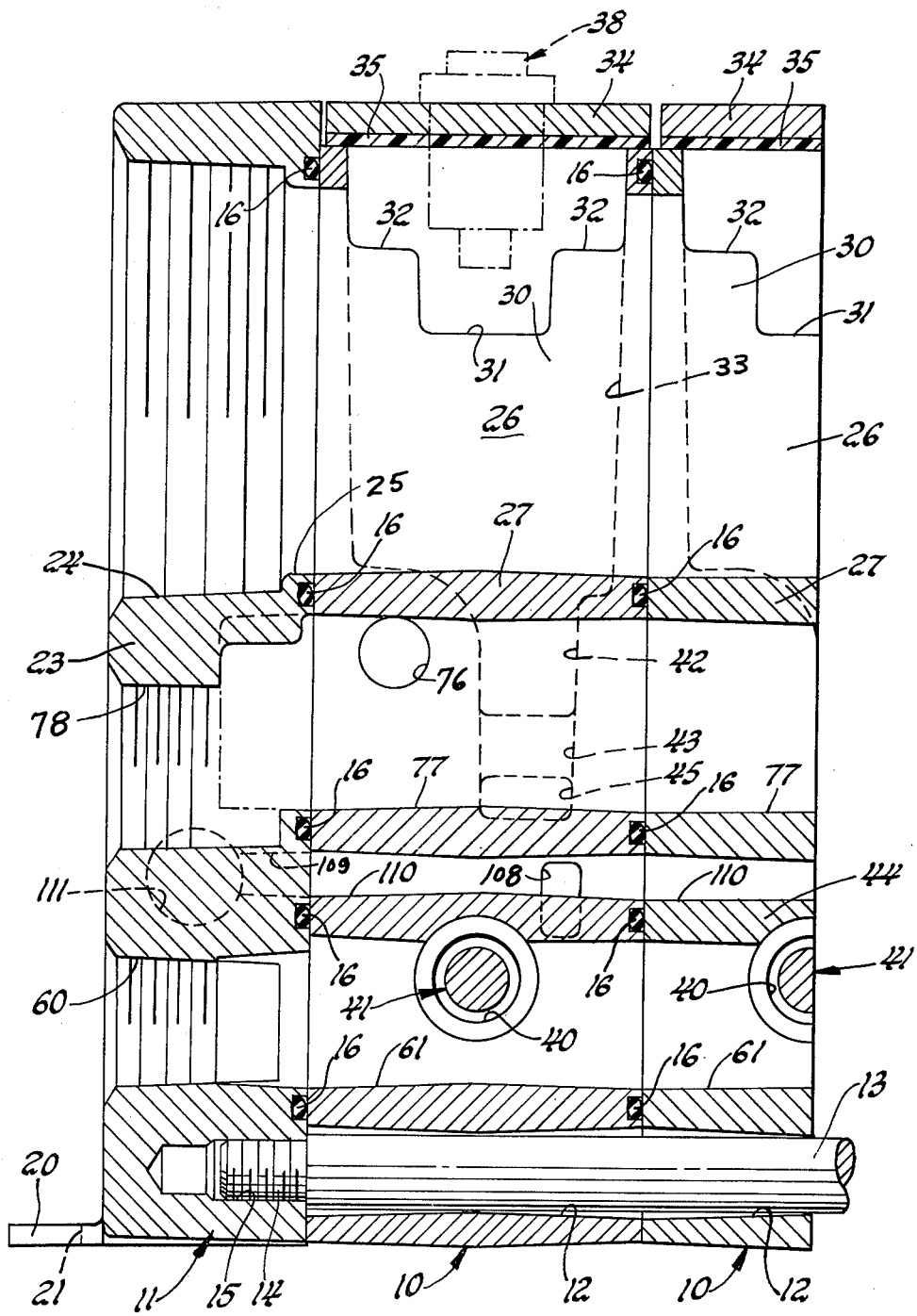
FIG. 4 is an elevation section view of the valve structure illustrated in FIG. 2, taken along the line 4—4 thereof, and looking in the direction of the arrows.

Referring now to the drawings, and in particular to FIGS. 1 through 3, each numeral 10 generally designates a separate four-way valve in a stack of valves. As viewed in FIGS. 1 and 4, one end of the stack of valves is seated against an end plate, generally indicated by the numeral 11, and it will be understood that a second end plate 11 would be seated against the other end of the stack of valves 10, and would be identically constructed, but reversed in position. As shown in FIGS. 2 and 4, the plurality of valves 10 in a stack is connected by a plurality of suitable tie rods 13 which extend through bores 12 in each of the valves 10, and have a conventional tie rod head on one end, and the other end provided with a reduced diameter threaded end 14 (FIG. 4), which is threadably mounted in a suitable threaded bore 15 in the illustrated end plate 11. As shown in FIG. 4, suitable seal members 16 are operatively mounted between each of the valves 10 in the stack and the end plates 11.

As shown in FIGS. 1 and 4, the end plate 11 is provided with a pair of suitable mounting feet or projections 20 on the outer lower side thereof. Each of the mounting feet 20 has a U-shaped opening 21 therein for the reception of a suitable mounting screw, or the like, for securing the stack of valves 10 to a suitable support table, or other means, between a pair of end plates 11.

As shown in FIGS. 1 and 4, the end plate 11 includes a body 23 which is provided on the upper end thereof with a longitudinal, threaded pipe bore 24 for the reception of a conventional electrical conduit, for carrying electrical wires connected to a suitable power source, for powering the solenoids for operating each of the valves 10. The inner end of the threaded pipe bore 24 communicates with a bore 25 in the rear side of the end plate body 23 to complete the electrical wire passage through the end plate 11. As shown in FIG. 4, the electrical wire passage 25 is connected to a common electrical wire passage 26, which is formed longitudinally through the upper end of the adjacent valve 10. The other valves 10 in the stack of valves would each be provided with a similar common electrical passage 26, and said passages 26 would all be aligned with the electrical wire passages 24 and 25 in the two end plates 11 supporting the stack of valves 10.

As shown in FIG. 2, each of the valves 10 is provided with a valve body that is substantially T-shaped in cross section, and which has an upper portion 27 and a lower portion 44. As shown in FIG. 2, each of the electrical wire passages 26 in each of the valves 10 is bounded by a pair of laterally spaced apart internal integral walls 30 which have a T-shaped opening formed through each of the upper ends thereof, so as to provide on the upper end of each of the walls 30 a central top edge portion 31 that is disposed downwardly from the top of the valve body upper portion 27, and which is flanked by a pair of wall top edge portions 32, which are disposed upwardly from the wall central top edge portion 31. It will be seen that the electrical wires coming into the stack of valves 10 through the end plate passages 24 and 25, and into the valve passages 26 can be disposed over each of the passage walls 30 and into the electrical wire tuck chambers 33 (FIGS. 1 and 2), which are formed outboard of each of the internal walls 30 in the valve body upper portion 27.

As shown in FIG. 2, the top ends of the wire tuck chambers 33, and the top end of the electrical wire common passage 26 in each of the valves 10 are enclosed by a valve body cover 34. A suitable gasket 35 is mounted between the inner face of the cover 34 and the top end of the valve body upper portion 27. The valve body cover 34 is releasably secured to the valve body upper or top portion 27 by a plurality of suitable machine screws 36 which extend through the cover 34 into suitable threaded bores 37 in the valve body upper portion 27. The numeral 38 in FIG. 4 generally designates an optional indicator light which may be operatively mounted through the valve top end cover 34, and extended into the electrical wire common passage 26 for operative connection to the electrical wires for the solenoid operating each respective valve 10, so that when a solenoid or solenoids are operated, the indicator light 38 would be energized to show that the solenoid is operating.

The electrical wires for operating one or more solenoids 51 for each of the valves 10 are led down through the valvve body portions 27 and 44, and to the respective solenoids 51 by the following described passages. As shown in FIGS. 3 and 4, the left side of each of the valves 10 is provided with a wire passage 42, in the lower end of the valve body upper portion 27, which communicates with the lower end of the left wire tuck chamber 33. The passage 42 communicates at its lower end with the upper end of a reduced size passage 43 in the upper end of the valve body lower portion 44. The lower end of the wire passage 43 communicates with a passage or outlet opening 45 which extends to the exterior of the side of the valve body lower portion 44. As shown in FIGS. 1 and 2, the right side wire tuck chamber 33 is also connected by suitable wire passages 42 and 43 to a wire outlet opening or passage 45, so as to conduct electrical wires to a second solenoid 51 on the right end of the valve 10, if a second solenoid is used.

As shown in FIGS. 2 and 4, the illustrated valves 10 are each provided with the usual main valve spool bore 40, in which is operatively mounted the usual main valve spool, generally indicated by the numeral 41. The illustrated main valve spool 41 is spring operated in one direction, and pilot air operated in the opposite direction, with the flow of pilot air being controlled by a solenoid operated pilot valve, generally indicated by the numeral 50. As shown in FIG. 2, one end of the valve body lower portion 44, in which the return spring 49 of the main valve spool 41 is mounted, is enclosed by a suitable cover 46 and gasket 48. The cover 46 is secured in place on the valve body lower portion 44 by suitable machine screws 47.

As shown in FIG. 2, the numeral 59 designates a pilot valve adaptor housing, and the numeral 51 generally indicates a conventional solenoid which is operatively attached to the pilot valve adaptor housing 59 by suitable machine screws 55 (FIG. 3) mounted in threaded bores 56 in the outer side of the pilot valve adaptor housing 59. The pilot valve adaptor housing 59 is releasably secured to the left side of the valve body lower portion 44, as viewed in FIG. 2, by a pair of suitable machine screws 57 (FIG. 3) which are operatively mounted in threaded bores 58, in the valve body lower portion 44 (FIG. 2). As shown in FIG. 1, the solenoid wires 53 for energizing the illustrated solenoid 51 are conducted through wire passages 52 and 54, in the pilot valve adaptor housing 59 and the housing for the solenoid 51, respectively. The solenoid wires 53 are then conducted through the adjacent opening 45 (FIGS. 1 and 3) in the valve body lower portion 44, and thence upwardly through the adjacent wire passages 43 and 42, and into the left wire tuck chamber 33, as viewed in FIG. 1.

As shown in FIG. 4, the illustrated end plate 11 is provided with a longitudinal threaded inlet port 60 for connection to a suitable source of air under pressure. The inner end of the inlet port 60 is connected to one end of a longitudinal inlet air passageway 61 formed through the adjacent valve 10. The other valves 10 in the stack of valves are also provided with similar inlet air passageways 61 which extend completely therethrough, and which are connected to adjacent valves 10, or at the other end of the stack to another end plate 11. It will be understood that the end plate 11 at the other end of the stack of valves is not shown, but it would be the same as the end plate 11 shown in FIG. 4, and it would be provided with a similar threaded inlet air port 60.

As illustrated in FIG. 2, each of the valves 10 is provided with a pair of cylinder or work ports 62 and 63 which extend inwardly from the bottom end of the valve body lower end portion 44. The cylinder ports 62 and 63 are each connected to a cylinder chamber 64 and 65, respectively, in the main valve spool bore 40. As shown in FIG. 2, a pair of exhaust chambers 70 are formed in the valve body lower portion 44, at opposite ends of the main valve spool bore 40, and they communicate with the main valve spool bore 40. As shown in FIG. 2, the left exhaust chamber 70 is connected by an exhaust passage 71 that extends upwardly into communication with a transverse exhaust bore passage 73 in the valve body upper portion 27.

As shown in FIGS. 1 and 2, the outer end of the exhaust bore passage 73 communicates with an enlarged diameter transverse bore 82, that is open to the exterior of the valve body upper portion 27. An exhaust flow control valve, generally indicated by the numeral 74 is operatively mounted in the bores 73 and 82. The flow control valve 74 includes a valve element 75 which is operatively mounted in a transverse bore 76 that connects the exhaust bore passage 73 with a common exhaust outlet passageway 77 that extends longitudinally through the valve body portions 27 and 44. The exhaust flow control valve element 75 is shown in the closed position, but it will be understood that it is adjustable to the left, as viewed in FIG. 2, to permit a selective flow of exhaust air through the bore 76 into the common exhaust passageway 77, in a controlled manner, depending upon the location of the valve element 75 relative to the entrance end of the bore 76, namely, the left end of the bore 76, as viewed in FIG. 2. As shown in FIG. 4, the comon exhaust passageway 77 in the valve 10 adjacent an end plate 11 communicates with the inner end of a threaded common exhaust port 78.

As shown in FIG. 2, the exhaust flow control valve 74 further includes a valve stem 80 which is integral with the flow control valve element 75. The valve stem 80 is provided with an integral annular stop flange 79, for limiting the movement of the valve element 75 into the bore 76. The valve stem 80 is provided with an O-ring seal 88 that is mounted in a groove formed around the outer periphery of the valve stem 80, and which is slidably mounted in a bore 87 formed axially in the inner end of a flow control valve retainer 81. The flow control valve retainer 81 is mounted in the bore 82 and is releasably secured therein by a suitable retainer ring 83. The valve retainer 81 is provided with an axial threaded bore 89 in the outer end, which communicates with the bore 87. The outer threaded end of the valve stem 80 is threadably mounted in the threaded bore 89. The valve element 75 is adjusted to a desired position in the bore 76 by means of a screw driver, or the like, being placed in the slot 85, in the outer end of the valve stem 80, and turning the valve stem 80 in a desired direction. The valve stem 80 may be locked in a desired adjusted position by a suitable lock nut 86.

As shown in FIG. 2, the exhaust chamber 70 at the right end of the main valve spool bore 40 is also connected by a passage 71 to a passage 72 (FIG. 1). As shown in FIG. 1, the passage 72 connected to the last mentioned passage 71 is connected to an exhaust chamber 73 in which is operatively mounted a second exhaust control valve generally indicated by the numeral 90. As shown in FIG. 1, the exhaust flow control valves 74 and 90 are symmetrically and oppositely disposed in each of the valves 10. The exhaust flow control valves 74 and 90 permit the metering of exhaust from either end of an air cylinder, or the like, to control the operating speed thereof, and also provide the advantages of stacking and a common electrical conduit or passage for the electric wires for the solenoids operating the valves 10 in a stack, so that the connection to the electric power for each solenoid may be made in each individual solenoid station.

As shown in FIG. 2, each of the valve body lower end portions 44, is provided with a pair of longitudinally extended, common pilot air passageways 95 which are disposed on opposite sides of the inlet air passage 61. The common pilot air passageways 95 are aligned with mating pilot air passages 95 in adjacent valves 10 in a stack of such valves. As shown in FIG. 1, each of the common pilot air passageways 95, in the valve 10 adjacent an end plate 11, communicates with a mating longitudinal passageway 91 in the end plate 11. Each of the passageways 91 is connected, by a transverse threaded bore 92, to the pressurized air inlet port 60 in the end plate 11. It will be seen that the common pilot air passageways 95 can be supplied internally with pilot air from the inlet air port 60. If it is desired to provide an external supply of pilot air under pressure, then each of the passageways 92 can be closed by a plug, indicated by the numeral 93, which would be threadably mounted in the outer end of each of the threaded bores 92. Each of the passageways 91 in an end plate 11 could then be supplied through a passge 94 in the end plate 11 with pilot air under pressure from a suitable external source. The plug 93 which is threadably mounted in the outer end of each passage 94 would be removed to allow the passages 94 to be connected to said suitable source of external pilot air. It will be understood that both end plates 11 would be provided with the last described internal and external connection means and passage means for providing pilot air to the common pilot air passageways 95.

As shown in FIG. 2, the left pilot air passageway 95 communicates through a bore 96 with a longitudinal passageway 97 in the adaptor housing 59 of the pilot valve 50. The longitudinal passageway 97 communicates with a transverse pilot air passage 98 which is enclosed on its outer end by a threadably mounted plug 106. It will be understood that if internal pilot air is not supplied from the common pilot air passageways 95, that the plug 106 could be removed and the passageway 98 connected to an external source of pilot air under pressure for supplying pressurized air to the pilot valve 50.

The pilot air valve 50 includes a pilot air valve element, generally indicated by the numeral 99, which is normally biased by a return spring 100 to the left, as viewed in FIG. 2 so as to block the flow of pilot air from the passageway 98 into the piston cylinder 101 to move the pilot piston 102 to the right to move the main valve spool 41 to the right, against the pressure of the valve return spring 49. The details of the structure and operation of the pilot valve 50 have not been given in detail since they do not form any part of the present invention. The details of the structure and operation of the pilot valve 50 are set forth in my co-pending application entitled "Four-Way Valve With Integral Flow Controls, Common Exhaust, And Cartridge Type Pilot Valve", Ser. No. 352,023, and the description of said pilot valve is incorporated herein by reference.

When the solenoid 51 is energized, the solenoid plunger 103 moves the pilot valve element 99 to the right, as viewed in FIG. 2, to allow pilot air to enter the piston cylinder 101 and move the pilot piston 102 to the right, to move the main valve spool 41 to the right against the pressure of the return valve spring 49. When the solenoid 51 is de-energized, the pilot air valve element 99 is returned to the position shown in FIG. 2 by the return spring 100, and the pilot air in the cylinder 101 behind, or to the left, of the pilot air piston 102, is allowed to exhaust down through the pilot valve structure and out through the front end of the piston cylinder 101, and through a transverse exhaust passage 108 which is connected to a longitudinal common pilot air exhaust passageway 110. The main valve spool 41 is then returned to the position shown in FIG. 2 by the return spring 49. FIG. 2 shows the pilot air passage 107 for use when a second solenoid operated pilot air valve is employed on the right end of the main valve spool 41 instead of the return spring 49. The exhaust passage 108 for the pilot air valve 50 is seen in FIG. 3. As shown in FIG. 4, the pilot air exhaust passageways 110 in a stack of valves 10 are aligned with each other, and the valve 10 which is adjacent an end plate 11 has its pilot air passageway 110 connected to a longitudinal passageway 109 in the end plate 11. The end plate pilot air passage 109 is connected to a transverse passage 111 which extends to the outer side of the end plate 11 to permit the pilot air to be exhausted to the atmosphere. Alternatively, a muffler may be connected to the pilot air exhaust outlet passage 111, or suitable conduits may be connected thereto for conducting the exhausted pilot air to a point removed from the stack of valves.

The main valve spool 41 is shown generally, and it is schematically shown together with the return spring 49 to illustrate control by the main valve spool 41 of the flow of pressurized air between the inlet passage 61, the cylinder ports 62 and 63, and the exhaust port 95.

In use, the adjustable flow control valves 74 and 90 would be adjusted to provide a desired opening between the bore 76 and the valve element 75 of each of the flow control valves, to provide a desired speed of operation of an air cylinder to be controlled. It will be seen that the common electrical passage or channel 26, is advantageous in that only one conduit is necessary to bring in the necessary electrical wires to a stack of valves, and that each of the valves in the stack can be individually connected, as desired. The valves 10 of the present invention further provide the advantage of being able to provide a flow control function in the exhaust system of each of the valves, in a selective manner, and to have the exhaust air conveyed to one, or both, of the end plates 11, from where the exhaust air may be conducted to a muffler, or to a remote point, or exhausted to the atmosphere. A further advantage of the valve 10 of the present invention is that the valves 10 may be selectively provided with either an internal or an external supply of pressurized pilot air.

When the main valve spool 41 is in the position shown in FIG. 2, the inlet passage 61 is connected by the passage 65 to the cylinder port 63, while the cylinder port 62 is connected by passage 64 to the left exhaust passage 70. When the solenoid 51 is energized, the main valve spool 41 is moved to the right to reverse the aforementioned flow conditions so that the inlet passage 61 supplies air under pressure to the cylinder port 62, and allows the other cylinder port 63 to exhaust to the exhaust passage 70 on the right end of the valve, as viewed in FIG. 2.

INDUSTRIAL APPLICABILITY

The four-way stacking valve, with integral flow controls, a common supply passageway, a common exhaust passageway, selective internal or external common pilot supply passageways, a common pilot exhaust passageway, and a common electrical conduit, is adapted for use in industrial air use applications. The valve of the present invention may be used for connection to both ends of an air cylinder for controlling the operation of the same in both directions. The air cylinder may be employed in various types of industrial machines. The valve spool may be a two-position, single or double solenoid type, or a three- position, close center or open center type.

I claim:

1. A four-way air valve which includes a valve body with a pressurized air supply chamber, a pair of cylinder chambers and a pair of exhaust chambers, and a main valve spool axially movable between two operative positions in a valve spool bore in the valve body to control flow of pressurized air from the air supply chamber to a selected one of said cylinder chambers while simultaneously controlling the exhaust from the other cylinder chamber to a selected one of said exhaust chambers, a top cover releasably mounted on said valve body, and means for moving the main valve spool between the two operative positions, characterized in that:

(a) said air supply chamber is disposed centrally along the valve spool bore which is longitudinally disposed, with the cylinder chambers disposed along the valve spool bore on opposite sides of said air supply chamber and adjacent thereto, and with the exhaust chambers disposed along the valve spool bore with one of the exhaust chambers adjacent to each one of the cylinder chambers on a side thereof opposite to the side adjacent to the air supply chamber;
   (b) the valve body is a stacking valve body provided with a pressurized transverse air inlet port which is connected by passage means in the valve body to the air supply chamber;
   (c) the valve body is provided with two cylinder ports which are each connected by separate passage means to one of the cylinder chambers;
   (d) the valve body is provided with a single exhaust port which is connected by a passage means to a common transverse exhaust passageway in the valve body, and each of the exhaust chambers is connected to the common exhaust passageway by a separate exhaust passage;
   (e) each of said separate exhaust passages between each exhaust chamber and the common exhaust passageway includes a bore portion forming a valve seat on one end communicating with the common exhaust passageway;
   (f) an adjustable flow control valve, provided with a valve element, is operatively mounted in the valve body adjacent each of the separate exhaust passage bore portions, with the valve elements thereof being movable into and out of the respective adjacent passage bore portions to control the flow of air exhausting from each exhaust chamber into the common exhaust passageway and out through the single exhaust port;
   (g) the valve body is provided with a common electrical wire passage that extends longitudinally therethrough;
   (h) the valve body is provided with an electrical wire tuck chamber on each side of the common electrical wire passage for receiving electrical lead wires from the common electrical wire passage; and,
   (i) each of said adjustable flow control valves is transversely disposed, and the flow control valves extend inwardly from opposite sides of the valve body.

2. A four-way air valve, as defined in claim 1, characterized in that:
   (a) said adjustable flow control valves are coplanar, and the longitudinal axes thereof are laterally offset from each other.

3. A four-way air valve, as defined in claim 1, characterized in that:
   (a) each of said adjustable flow control valves includes a valve stem that carries the valve element and which has an outer end extended exterior of the valve body to permit adjustment of the valve stem and valve element in its respective exhaust passage bore portion to control the flow of exhaust air to the common exhaust passageway.

4. A four-way air valve, as defined in claim 1, characterized in that:

(a) said means for moving the main valve spool to at least one operative position comprises a solenoid operated pilot air valve.

5. A four-way air valve, as defined in claim 4, characterized in that:
(a) said valve body includes electrical wire passages through which electrical wires are conducted to the solenoid operated pilot air valve, and thence to the solenoid for operating the pilot air valve.

6. A four-way valve, as defined in claim 5, characterized in that:
(a) said valve body is T-shaped in end elevation view, with a top end portion that is wider than the lower end portion, and the common electrical wire passage and electrical wire tuck chambers and adjustable flow control valves are positioned in the wider top end portion, and the solenoid operated pilot air valve is secured to the valve body lower end portion.

* * * * *